United States Patent [19]

Hirz et al.

[11] Patent Number: 5,037,065

[45] Date of Patent: Aug. 6, 1991

[54] BALL VALVE

[75] Inventors: Rudolf Hirz, Frankfurt/M-Nied, Fed. Rep. of Germany; Eric Vanhie, Gent-Wondelgem, Belgium

[73] Assignee: Durametallic Corporation, Kalamazoo, Mich.

[21] Appl. No.: 587,625

[22] Filed: Sep. 21, 1990

Related U.S. Application Data

[63] Continuation of Ser. No. 503,451, Apr. 2, 1990, abandoned.

[30] Foreign Application Priority Data

Apr. 14, 1989 [DE] Fed. Rep. of Germany ....... 3912350

[51] Int. Cl.$^5$ ........................................... F16K 41/10
[52] U.S. Cl. ................................. 251/214; 251/315; 277/111; 277/200
[58] Field of Search ...................... 251/214, 315, 335.3; 277/108, 110, 111, 112, 200

[56] References Cited

U.S. PATENT DOCUMENTS

| | | | |
|---|---|---|---|
| 600,249 | 3/1898 | Parsells | 251/335.3 |
| 3,096,966 | 7/1963 | McFarland, Jr. | 251/214 |
| 3,206,165 | 9/1965 | Salmon et al. | 251/214 |
| 3,403,917 | 10/1968 | MacSpadder et al. | 277/110 |
| 3,427,034 | 2/1969 | Lowe | 277/200 |
| 3,902,696 | 9/1975 | Ito et al. | 251/335.3 |
| 3,970,285 | 7/1976 | Lonn | 251/288 |
| 4,553,564 | 11/1985 | Baram | 251/214 |

OTHER PUBLICATIONS

Sealol Bulletin HP12 "2200 Class Packless Valves", 6/1961, 4 pages.
Sealol "Ball Valves", 6/1961, 1 page.
Eagle Packless Valves, Bulletin 2200, EG&G Sealol Eagle, 5/1972, 12 pages.
ACHEMA-88 Brochure-Tradeshow, 1/89, p. 15.

*Primary Examiner*—George L. Walton
*Attorney, Agent, or Firm*—Flynn, Thiel, Boutell & Tanis

[57] ABSTRACT

A sealing system in a ball valve is designed with a bellows which carries a sliding packing ring on the side of the valve housing and presses against a sliding packing ring on the side of the pivot shaft. The bellows is protected by a guard ring. The ball valve has a shaft coupled to a cap through a releasable locking device.

9 Claims, 2 Drawing Sheets

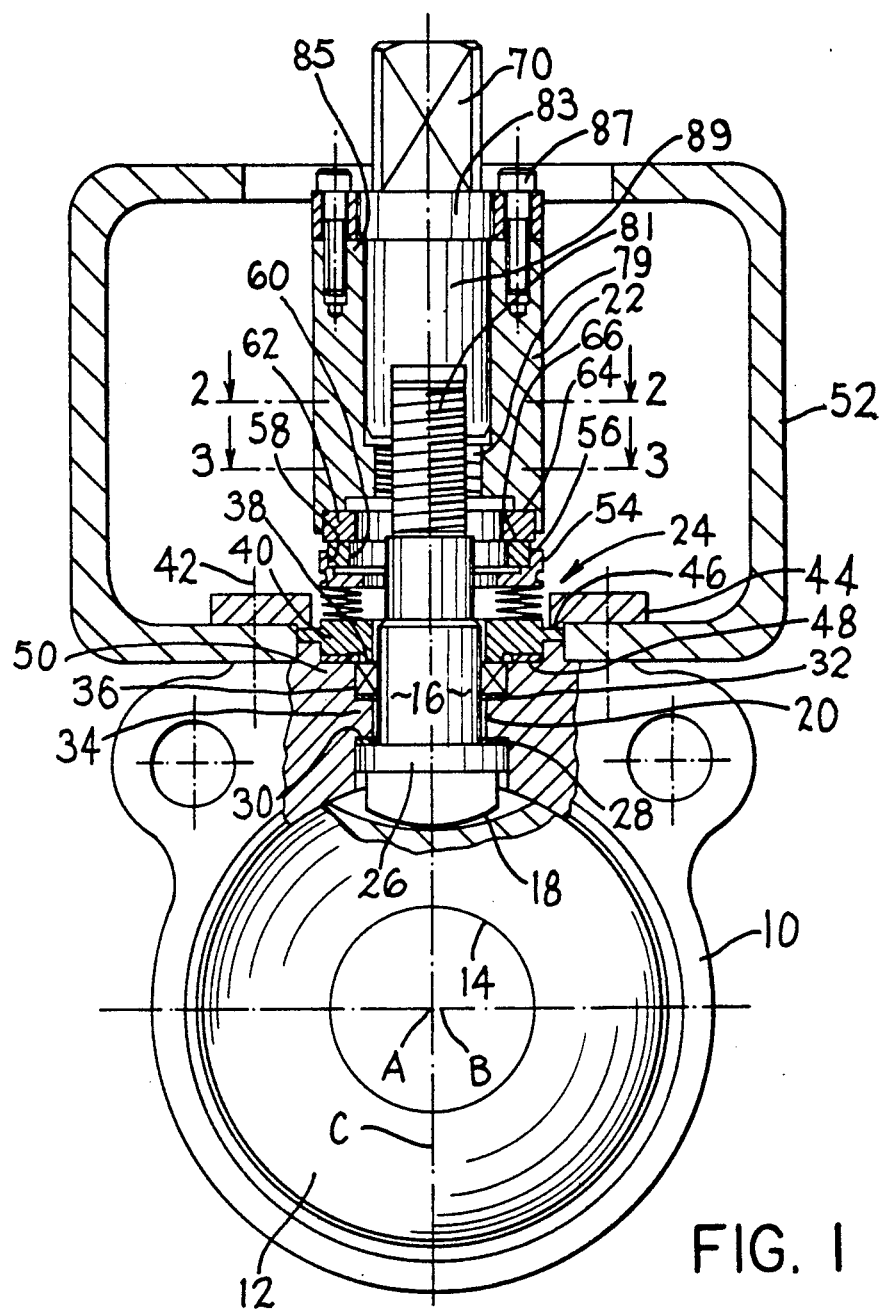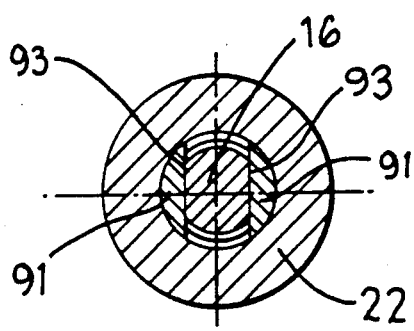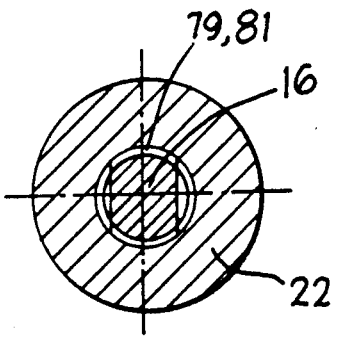
FIG. 1
FIG. 2
FIG. 3

BALL VALVE

This application is a continuation of U.S. Ser. No. 07/503,451, filed Apr. 2, 1990, now abandoned.

FIELD OF THE INVENTION

This invention relates to a valve including a valve housing with a flow axis, a valve member housed in said valve housing, which valve member is pivotal about a pivot axis which is perpendicular with respect to the flow axis, a pivot shaft which is connected fixed against rotation to the valve member, is guided through a lead opening of the valve housing, and is supported pivotally about the pivot axis, and a sealing system between the pivot shaft and the valve housing for sealing off the lead opening.

BACKGROUND OF THE INVENTION

Ball valves are extensively utilized. A packing, which is clamped between the valve housing and the pivot shaft in the area of the lead opening of the valve housing, is used in these conventional ball valves as a sealing system. The packing is dynamically loaded through the pivoting of the valve shaft during opening and closing of the ball valve and is therefore subjected to wear. Leakage can occur during wear. Such leakage can be most undesirable and dangerous if environmentally damaging fluids are guided through the valve.

A ball valve was introduced at the 1988 Achema show in which the sealing system is designed with a base ring which is statically sealed off on the valve housing and which surrounds the pivot shaft; a bellows, which rises above said base ring away from the flow axis, is connected fixed against rotation and tightly to the base ring and surrounds the pivot shaft; a bellows end ring, which is connected fixed against rotation and tightly to the bellows on its end which is remote from the flow axis, surrounds the pivot shaft; a first sliding packing ring, which is attached fixed against rotation and tightly to the bellows end ring, surrounds the pivot shaft and is on the side of the valve housing; and a second sliding packing ring, which is connected fixed against rotation and tightly to the pivot shaft, surrounds the pivot shaft and said two sliding packing rings rest sealingly and slidingly against one another under a sealing pressure produced in particular by the bellows. The sliding packing ring is thereby mounted tightly and fixed against rotation on a cap, which is closed off tightly and grips over the end of the pivot shaft, which end is with respect to the flow axis the radial outer end of the pivot axis, and said cap is screwed to the pivot shaft and is secured against an unintended rotation.

A purpose of the invention is to more reliably design the screwed lock between the pivot shaft and the cap while simultaneously maintaining the seal.

To attain this purpose, the invention suggests that the cap has an opening which, at its end which is remote from the flow axis, is tightly closed off by a removable cap lid, and wherein a releasable locking means are positionable within the cap and, with the cap lid secured to the cap, the locking means secure the cap against screwing (i.e. rotation) relative to the pivot shaft. Working surfaces for engagement by a tool are provided on the cap or on the cap lid.

An easy access to the locking means is assured in the construction of the invention in that only the cap lid needs to be released in order to make said locking means accessible.

According to an embodiment, which is particularly advantageous for installation purposes, the locking means are formed by a fork member with fork legs, which rest on flat portions of the pivot shaft, which fork member is constructed fixedly in particular in one piece with the cap lid, with the cap lid being fixedly and sealingly secured on the cap.

According to another embodiment, the locking means includes at least one key received in a keyway inside of the cap, with said key resting at the same time on a flat portion of the pivot shaft.

The cap lid can be secured on the cap by fastening screws. To seal off the space within the cap, a flat gasket ring is arranged between the cap and the cap lid.

BRIEF DESCRIPTION OF THE DRAWINGS

The attached figures explain the invention in connection with exemplary embodiments wherein:

FIG. 1 is a central sectional view of a first embodiment of the invention;

FIG. 2 is a cross-sectional view along line 2—2 of FIG. 1;

FIG. 3 is a cross-sectional view along line 3—3 of FIG. 1;

DETAILED DESCRIPTION

Figure 4:
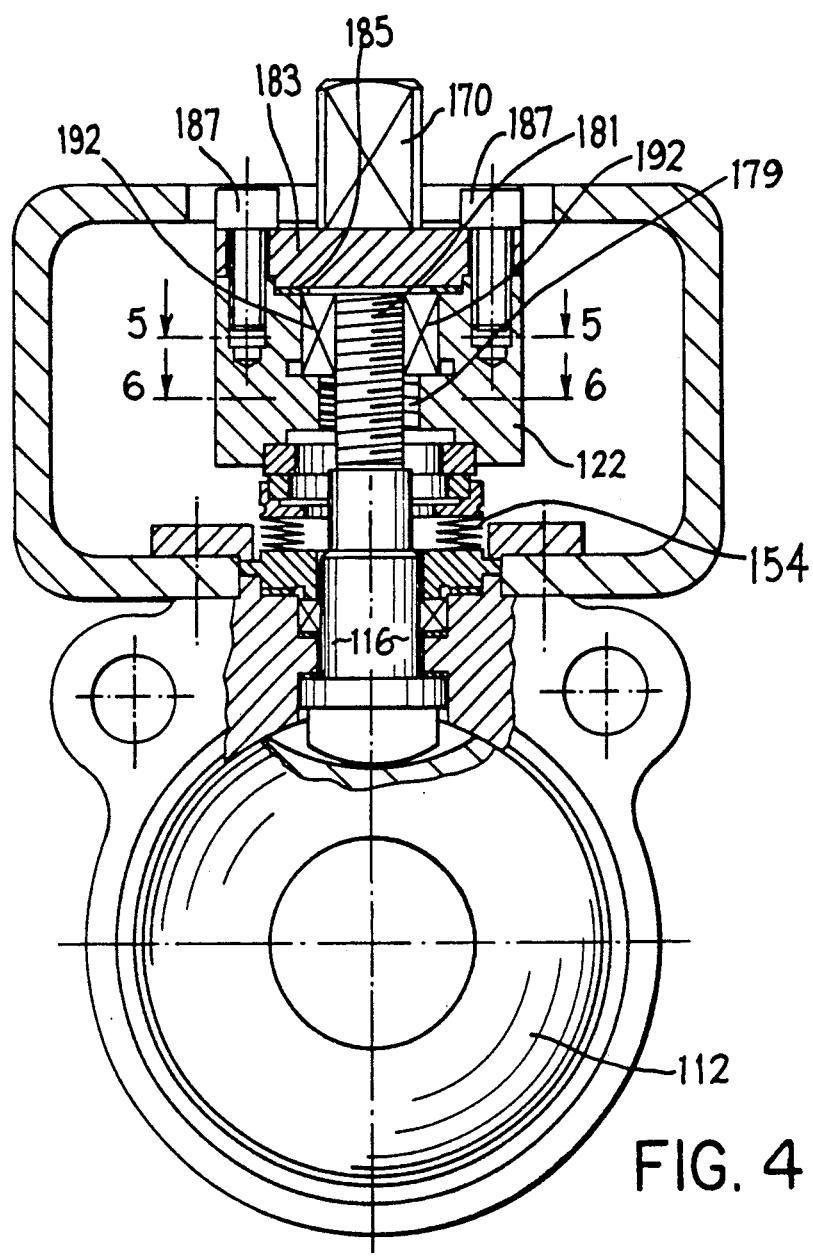
FIG. 4 is a central sectional view of a second embodiment of the invention.

Reference numeral 10 in FIG. 1 identifies a valve housing of a ball valve. A ball-shaped valve member 12 is received in the valve housing, which valve member has a flow passage 14 therethrough. The axis of the passage 14 is identified by letter A. The flow axis of the valve housing 10 is identified by letter B and extends perpendicularly with respect to the plane of the drawing. The valve housing 10 can be composed of several parts by means of flanged eyelets in order to install the valve member 12 into the valve housing and also in order to house the necessary seals, which valve member 12 in the blocked position according to FIG. 1 interrupts the flow through the valve housing 10 in the direction of the flow axis B and, if necessary, completely close off the passage 14 of the valve member 12. The valve member 12 can be rotated 90 about a pivot axis C so that the passage axis A then coincides with the flow axis B and the valve is open.

The valve member 12 is nonrotatably fixedly connected to a pivot shaft 16 through a formed engagement 18 so that the valve member 12 and pivot shaft 16 can be easily mounted. The pivot shaft 16 extends through a lead opening 20 in the valve housing and carries on its end, which is remote from the passage axis B, a cap 22 which is threadedly connected to said pivot shaft end and is tightened thereto.

A valve sealing system, generally identified by reference numeral 24, is housed between the pivot shaft 16 and the valve housing 10. Said sealing system is discussed in greater detail hereinafter.

A flange 26 is mounted on the pivot shaft 16, which flange rests against a seal or packing 28, which in turn is supported under pressure on a shoulder 30 of the lead opening 20. The seal or packing 28 can be considered to be a forward seal.

A further forward seal 32 rests at one end against a shoulder 34 of the lead opening 20 and at the other end against a support ring 36 which is secured by a base ring 40. The base ring 40 has a ring shoulder 38 which is urged against the support ring 36. The base ring 40 is held on the other side by a ring 44, which is identified as a guard ring for reasons which are discussed later. Said guard ring 44 has a collar 46 which acts on the base ring 40 and presses said base ring and thus the support ring 34 downwardly against the seal or packing 32. The base ring 40 is simultaneously pressed against a static ring seal 48, which in turn rests on a shoulder 50 of the passage opening 20. The guard ring 44 together with a cage 52 are secured to the valve housing 10 by screws 42. The lower end of a bellows 54 is tightly connected to the base ring 40 and the upper end of said bellows 54 is connected tightly and fixedly to a bellows end ring 56. The bellows end ring 56 has an upwardly and radially inwardly open annular groove 58, into which is glued or secured a lower sliding packing ring 60. An upper sliding packing ring 62 is fixedly glued or secured into a recess 64 at the lower end of the cap 22. The two sliding packing rings 60, 62 rest sealingly against one another with axially normal sliding surfaces under the spring pressure of the bellows 54 to define an outer facial joint 66. The two forward seals 32, 28 are subjected to dynamic stress during pivoting of the pivot shaft 16 and can wear. Medium can then enter into the space inside of the bellows 54. However, the medium cannot exit beyond said space since the base ring 40 is tightly connected to the housing by the static seal 48, since also the bellows 54 is tightly connected to the base ring 40 and to the bellows end ring 56, since further the lower sliding packing ring 60 is tightly glued to the bellows end ring 56, since furthermore the cap 22 is itself self-contained and is glued to the upper sliding packing ring 62, and since finally the two sliding packing rings 60, 62 rest against one another with practically indestructible, highly precision-worked sealing surfaces. The bellows 54 and the sliding packing rings 60, 62 are thereby arranged and constructed such that they can withstand the full pressure of the medium within the valve housing 10, even if the two dynamic seals 28, 32 fail altogether. The sliding packing rings consist for example of ceramic material.

A multi-surfaced tool-engaging part 70 is provided on the upper end of the cap 22. The pivot shaft 16 and thus the valve member 12 can be rotated through said multi-surfaced part 70.

The sealing pressure in the dynamic seals 28 and 32 can be produced by the initial biasing of the bellows 54. Of course, it is possible to produce this sealing pressure also through other elastic means.

The base ring 40 forms together with the bellows 54, the bellows end ring 56 and the lower sliding packing ring 60 a premanufactured unit which can be exchanged as a whole.

It must be stated that the bellows 54 is important for the tightness of the entire system. Said bellows 54 is a sensitive structural element and is protected against possible damage during installation and during operation according to the invention by the guard ring 44. The height of the bellows 54 corresponds approximately with the height of the guard ring 44 so that the bellows is hence protectively enclosed within the guard ring.

The cap 22 is screwed by means of an internal thread 79 onto an external thread 81 of the pivot shaft 16. By suitably tightening the screwed coupling, the desired pressure of the bellows 54 can be adjusted. The multi-surfaced part 70 is constructed in one piece as part of a cap lid 83 which is fixed to the upper end of the cap 22 by cap screws 87 with a cap seal 85 disposed therebetween. A fork member 89 with two fork legs 91 is fixedly mounted on an project axially downwardly from the lower end of the cap lid 83 (FIG. 2). The two fork legs 91 enclose or straddle flat portions 93 formed on opposite sides of the pivot shaft 16. Thus, a form-locking connection between the part 70 and the pivot shaft 16 is created through which a torque applied to the drive part 70, as by a wrench, can be safely transmitted onto the pivot shaft 16 to open and close the valve. The cap 22 is at the same time lockingly secured against screwing on the pivot shaft 16 since the pivot shaft 16 on the one hand is fixed against rotation with respect to the fork member 89 by the fork legs 91 and on the other hand the cap lid 83 is connected in one piece with the fork member 89 and is simultaneously lockingly connected to the cap 22 by the cap screws 87. This assures that the initial selected screw adjustment of the cap 22 on the pivot shaft 16, which initial adjustment occurs prior to mounting the lid 83 on the cap 22, cannot be lost and thus the once chosen initial biasing pressure of the bellows 54 is maintained.

The medium from the valve housing 10 may possible reach the seal 85 but, however, is ultimately held back by the cap lid 83.

Figure 5:
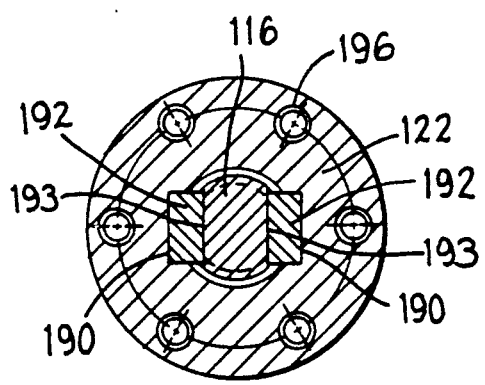
FIG. 5 is a cross-sectional view along line 5—5 of FIG. 4.
Figure 6:
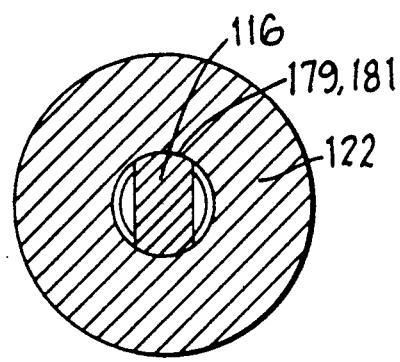
FIG. 6 is a cross-sectional view along line 6—6 of FIG. 5.

The embodiment of FIGS. 4 to 6 differs from the one according to FIGS. 1 to 3 in a differently designed connection between the pivot shaft 116, the cap 122 and the multi-surfaced part 170. Analogous parts are identified with the same reference numerals as in FIGS. 1 to 3, but with the addition of 100 thereto. The cap 122 also has an internal thread 179 which is screwed to an external thread 181 of the pivot shaft 116 so that it is possible to adjust the initial biasing pressure of the bellows 154 through a suitable screwed coupling. Keyways 190, into which keys or adjusting springs 192 are inserted, are constructed on the inside of the cap 122, as shown in FIG. 5. These keys 192 bear on the flat portions 193 of the pivot shaft 116. The cap lid 183 is secured to the cap 122 by cap screws 187 and is sealed off against same by a flat gasket ring 185. Since the multi-surfaced drive part 170 is manufactured in one piece with the cap lid 183, the cap lid 183 is connected in a fixed and sealed manner with the cap 122, and the cap 122 is connected nonrotatably with the pivot shaft 116 through the keys 192, whereby a torque applied to the multi-surfaced part 170 is transmitted onto the pivot shaft 116 to angularly moVe the valve member 112 about the axis C. Furthermore, the screwed coupling 179, 181 is secured against an unintended adjustment, namely again by the keys 192, which nonrotatably engage both the pivot shaft 116 and the cap 122 so that the cap 122, after the introduction of the keys 192, can no longer screw or rotate with respect to the pivot shaft 116. The distance between the adjacent tapholes 196 for the cap screws 187 is, as can be seen from FIG. 5, equal, such as at angles of 60 degrees, so that the lid 183 can be secured to cap 122 at different angular positions. Thus the possibility exists - as this is also the case with the embodiment according to FIGS. 1 to 3 - to finely adjust the initial biasing pressure of the bellows 154.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A valve including a valve housing with a flow axis, a valve member in said valve housing, which valve member is pivotal about a pivotal axis which is perpendicular with respect to the flow axis, a pivot shaft which is connected fixed against rotation to the valve member and is guided through a lead opening in the valve housing and is supported pivotally about the pivot axis, and a sealing system between the pivot shaft and the valve housing for sealing off the lead opening, said sealing system being designed with a base ring which is statically sealed off on the valve housing and surrounds the pivot shaft, a bellows which projects from said base ring away from the flow axis and is connected fixed against rotation and tightly to the base ring and surrounds the pivot shaft, a bellows end ring which surrounds the pivot shaft and is connected fixed against rotation and tightly to the bellows on its end which is remote from the flow axis, a first sliding packing ring which is attached fixed against rotation and tightly to the bellows end ring and which surrounds the pivot shaft, and a second sliding packing ring which surrounds the pivot shaft, said two sliding packing rings resting sealingly and slidingly on one another under a sealing pressure produced in part by the bellows, and the second sliding packing ring being mounted tightly and fixed against rotation on a tightly sealed cap which grips over the end of the pivot shaft, which end is the radial outer end with respect to the flow axis, said cap being screwed to the pivot shaft for an adjustable movement, the improvement wherein the cap has at its end remote from the flow axis an opening tightly sealed off by a removable cap lid, a releasable locking means is stored inside of the cap and is releasable when the cap lid is released for allowing a biasing pressure of the bellows to be selectively adjusted by rotating the cap on the screwed pivot shaft prior to the securing of the cap lid and the locking means, said locking means securing the cap against rotational screwed movement relative to the pivot shaft, and working surfaces for engagement by a tool are provided on the cap or on the cap lid, thereby permitting the pivot shaft to be pivoted for moving the valve member, while preventing any axial movement of the sealing system and maintaining the preselected bellows biasing pressure.

2. A valve according to claim 1, wherein the locking means is formed by a fork member with axially extending fork legs which rest on flat portions of the pivot shaft, the fork member is constructed fixedly in one piece with the cap lid, and the cap lid is nonrotably secured on the cap.

3. A valve according to claim 2, wherein the cap lid is secured to the cap by threaded fasteners.

4. A valve according to claim 1, wherein the locking means is formed by at least one key received in a keyway inside of the cap, with said key resting at the same time on a flat portion of the pivot shaft.

5. A valve according to claim 1, wherein the cap lid is secured on the cap by fastening screws.

6. A valve according to claim 1, wherein the working surfaces are formed by a multi-surfaced part manufactured in one piece with the cap lid.

7. A valve according to claim 1, wherein a flat gasket ring is provided between the cap and the cap lid.

8. A valve according to claim 1, wherein the locking means includes an axially elongate locking member which is nonrotably engaged with the pivot shaft and is positioned inside of the cap.

9. A valve according to claim 8, wherein the cap lid is nonrotably secured to the cap, and the locking member is nonrotably secured to one of said cap and cap lid.

* * * * *